(12) United States Patent
Borkar

(10) Patent No.: US 8,894,816 B2
(45) Date of Patent: Nov. 25, 2014

(54) VINYLAMINE CONTAINING COPOLYMER MICROPARTICLES AS ADDITIVES IN PAPERMAKING

(71) Applicant: Hercules Incorporated, Wilmington, DE (US)

(72) Inventor: Sachin Borkar, Wilmington, DE (US)

(73) Assignee: Solenis Technologies, L.P. (CH)

( * ) Notice: Subject to any disclaimer, the term of this patent is extended or adjusted under 35 U.S.C. 154(b) by 217 days.

(21) Appl. No.: 13/666,443

(22) Filed: Nov. 1, 2012

(65) Prior Publication Data

US 2013/0118699 A1 May 16, 2013

Related U.S. Application Data

(60) Provisional application No. 61/557,949, filed on Nov. 10, 2011.

(51) Int. Cl.
| | | |
|---|---|---|
| C08F 222/38 | (2006.01) | |
| C08F 212/08 | (2006.01) | |
| D21H 17/35 | (2006.01) | |
| C08F 226/02 | (2006.01) | |
| D21H 17/36 | (2006.01) | |
| D21H 17/37 | (2006.01) | |
| D21H 17/55 | (2006.01) | |
| D21H 17/56 | (2006.01) | |

(52) U.S. Cl.
CPC ............. *C08F 226/02* (2013.01); *D21H 17/35* (2013.01); *D21H 17/36* (2013.01); *D21H 17/37* (2013.01); *D21H 17/55* (2013.01); *D21H 17/56* (2013.01); *C08F 212/08* (2013.01)
USPC ..... 162/164.6; 524/555; 524/577; 526/307.3; 526/307.8

(58) Field of Classification Search
CPC ............................ C08F 222/38; C08F 212/08
USPC ...................... 524/555, 577; 526/307.3, 307.8
See application file for complete search history.

(56) References Cited

U.S. PATENT DOCUMENTS

| 2,621,140 | A | 10/1955 | Weisgerber |
| 4,255,548 | A | 3/1981 | Wingard, Jr. et al. |
| 4,328,579 | A | 5/1982 | Hashimoto et al. |
| 4,421,602 | A | 12/1983 | Brunnmueller et al. |
| 4,774,285 | A | 9/1988 | Pfohl et al. |
| 5,630,907 | A | 5/1997 | Nilz et al. |
| 5,961,782 | A | 10/1999 | Luu et al. |
| 6,159,340 | A | 12/2000 | Niessner et al. |
| 6,616,807 | B1 | 9/2003 | Dyllick-Brenzinger et al. |
| 2008/0319150 | A1 | 12/2008 | Loesch et al. |
| 2010/0193148 | A1 | 8/2010 | McKay et al. |

FOREIGN PATENT DOCUMENTS

EP 0251182 7/1988

OTHER PUBLICATIONS

Shevchenko et al. High Energy Chemistry 2008, 42(7), 532-534.*
Pinschmidt et al. Process in Organic Coatings, 1996, 27, 209-218.*
International Search Report, PCT/US2012/063020, dated May 12, 2012, pp. 2.
Journal of Polymer Science: Part A: Polymer Chemistry, vol. 48, 2257-2283 (2010) (C) 2010 Wiley Periodicals, Inc.

* cited by examiner

*Primary Examiner* — Vu A Nguyen
(74) *Attorney, Agent, or Firm* — Michael J. Herman; Joanne Rossi

(57) ABSTRACT

Surfactant mediated, free radical initiated emulsion/dispersion polymerization of n-vinylformamide with styrene or substituted styrene copolymers, and its subsequently hydrolyzed products bearing formamide, amine and styrenic functionality are disclosed. Processes for polymerization, polymer composition, and hydrolysis of such polymers are also disclosed. These polymers bearing cationic functionality can be used in papermaking applications as dry strength additives, wet strength additives, retention aids, drainage aids, sizing agent, sizing promoter and pitch and stickies control agents.

25 Claims, No Drawings

VINYLAMINE CONTAINING COPOLYMER MICROPARTICLES AS ADDITIVES IN PAPERMAKING

FIELD OF THE INVENTION

This invention relates to a process for making vinylamine-vinylformamide styrene terpolymer additives comprising reacting n-vinylformamide (VFA) with styrene or substituted styrene or vinyl pyridine, and subsequent hydrolysis to form vinylamine (VAm)-styrene terpolymers. The resulting aqueous dispersion containing microparticles of vinylamine-vinylformamide-styrene terpolymers can be used as a cost effective paper making additive to improve paper making process and paper dry strength properties.

BACKGROUND OF THE INVENTION

Due to the ability of cationic functionality of polymer to hydrogen bond with cellulose fibers, polymers containing amine functionality are well studied in paper industry. Use of cationic polymer has proven improvement in paper strength, drainage, retention and several other properties. Several patents and research articles discusses use of polyvinylamine as a paper making additive. U.S. Pat. No. 2,721,140 discloses use of polyvinylamine as an additive to make papers having high wet strength, while U.S. Pat. No. 5,961,782 discloses use of polyvinylamine to make crosslinkable creping adhesive formulations.

Among the polymers with amine functionality, the cost effective synthesis of polymer containing primary amine functionality has been a challenge for generations. The monomers that can introduce primary amine functionality, on polymerization are allylamine and vinylamine (VAm) or, on hydrolysis are vinylformamide (VFA) and vinyl acetamide. Due to lack of conjugation in allylamine and presence of free amine functionality, polymerization of allylamine is relatively sluggish and also leads in several side reactions like inhibition or chain transfer. Therefore, it is challenging to synthesize allylamine containing polymers with high molecular weight. Whereas, vinyl amine monomer does not exist in free state, and hence it was not possible to synthesize polyvinylamine. The significant efforts by the Air Products and Chemicals Inc., BASF and DiaNitrix resulted in vinylformamide monomer. BASF launched the industrial production of vinylformamide (VFA) momomer that can be effectively polymerized by using radical initiators to synthesize materials with high molecular weight. VFA homopolymers as well VFA copolymers with vinyl monomers offers a material with distinctive chemical and physical properties. The hydrolysis of poly(VFA) results in a material with pendant primary amine functionality that makes these polymers highly cationic in nature. The introduction of primary amine functionality on alternate carbon atoms yields the material with a relatively high charge density and cationicity that makes this material as an attractive and viable candidate for variety of commercial applications. U.S. Pat. No. 4,421,602 discloses a partially hydrolyzed, water-soluble polymer of n-vinylformamide that contains n-vinylformamide units and vinylamine units. It also discloses use of polyvinylamine and a 50% hydrolyzed polyvinylformamide to increase flocculation efficiencies, fines retention, and the drainage rate of pulp fiber in papermaking processes, while U.S. Pat. No. 6,159, 340 discloses the use of such polymers as dry and wet strength additives in paper and paperboard production. U.S. Pat. Nos. 6,616,807 and 6,797,785 disclose use of polyvinylamines as drainage aids, flocculants, and retention aids in the paper making.

Vinylformamide copolymers and their subsequently hydrolyzed products are also known additives for paper applications. U.S. Pat. No. 4,774,285 discloses that n-vinylformamide monomer may be copolymerized with an additional vinyl monomer, e.g., vinyl acetate, and subsequently hydrolyzed to produce a water-soluble copolymer of vinylamine and vinyl alcohol, which may be used as wet and dry strength additives for papermaking. U.S. Pat. No. 5,630,907 discloses copolymer compositions containing vinyl amine and acrylic acid units, as well as their applications. U.S. Pat. No. 6,797, 785 discloses copolymers containing vinylamine units in combination with either diallyldimethylammonium (chloride) (DADMAC) or acrylamide units via reverse emulsion polymerization, and their use as flocculants and coagulants in papermaking. EP 0251182 discloses copolymers containing vinylamine and acrylonitrile units for use in papermaking as drainage aids, retention aids, as well as wet end additives for increasing the dry strength of paper products.

Styrene containing polymers are also well utilized in a variety of applications, due to their relatively low cost, and compatibility with other polymers. The aromatic group of styrene offers unique properties to the material namely, better hydrophobicity, higher thermal stability, and resistance to acid or base conditions during hydrolysis. U.S. Pat. No. 4,328,579 discloses copolymerization of n-vinyl acetamide with styrene and substituted styrene and its subsequent hydrolysis to form styrene-vinyl amine copolymer. However, the copolymerization reactions are slow and need almost 57 hours to achieve 96% conversion. Additionally the polymer needs to be purified by precipitation in a non-solvent to remove residual monomer, and the soluble nature of the material suggests the obtained polymers have a relatively low molecular weight. On the other hand attempts to copolymerize styrene with VFA resulted in lower conversions and lower molecular weight material. (Journal of Polymer Science Part A: Polymer Chemistry, 2010, 48, 2257-2283).

Therefore, it is desirable to develop a polymerization process to copolymerize styrene with VFA with high efficiency of shorter reaction time resulting in high conversion of the monomers into the polymer products without further purification. It is also desirable to produce a cationic copolymer containing VAm, VFA, and styrene groups, which can be used as a cost effective dry strength additive in papermaking and has many other potential applications.

SUMMARY OF THE INVENTION

The present invention relates to a radically initiated, surfactant mediated emulsion copolymerization of VFA with styrene or substituted styrene, and its subsequent hydrolysis to form micro particulate VAm, VFA and styrene terpolymer. The ratio of VFA to styrene or substituted styrene in copolymer can be varied from 99:1 to 50:50, can be 80:20 to 51:49, and may be 80:20 to 70:30. The micro particulate VFA-styrene copolymers can be subsequently hydrolyzed by acids or bases treatment to introduce vinylamine functionality to form vinylamine, n-vinylformamide and styrene terpolymer. The partially hydrolyzed terpolymer micro particles described in this invention can be used to enhance the dry strength, wet strength, drainage, fixative, and sizing properties of paper when used as additives in the papermaking process and has many other potential applications.

DETAILED DESCRIPTION OF THE INVENTION

As used herein and unless otherwise stated: (1) all percentages, parts, ratios, etc., are by weight; (2) when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed; (3) the term "total solids" refers to the solids that remain after the volatiles (e.g., solvents) have been removed from styrene-vinylformamide resin or composition thereof; (4) the term "active solids" refers to the at least one styrene-vinylamine resin portion of the total solids remaining after subtraction of inorganic content from the styrene-VFA polymer used in the feed.

This invention relates to a radically initiated, surfactant mediated emulsion polymerization process to polymerize N-vinylformamide (VFA) and styrene or substituted styrene or vinyl pyridine. The polymerization reaction results in quantitative conversions (>99%) and obtained material are micro particles in nature and can be used without any purification. Subsequent hydrolysis of resulting material introduces vinylamine (VAm) functionality, forming terpolymer containing VAm, VFA, and styrene groups. Also, VFA on hydrolysis readily forms amidine functionality, whereas the presence of methyl functionality in vinylacetamide significantly delays or limits amidine formation. The obtained polymer can be used as a cost effective dry strength additive in papermaking and has many other potential applications.

The present invention provides a process to produce a water dispersible additive which contains vinylamine units, vinyl aromatic units, has micro particulate structure, is cationic in nature, and when used as a paper making additive in the wet end of a paper making process, it helps to improve strength properties of the paper. According to this invention, VFA is polymerized with styrene or substituted styrene by free radical initiated, surfactant mediated emulsion polymerization and its subsequent hydrolysis. The hydrolyzed product maintains micro particulate structure, is cationic in nature, is easily dispersible in water, and helps to improve paper making process and paper strength properties. Whereas, the vinylacetamide and styrene copolymers and their subsequently hydrolyzed materials disclosed in U.S. Pat. No. 4,238,579 need longer reaction time, are semi-quantitative in conversion and needs a purification step, the soluble nature of the obtained material suggest lower molecular weight polymers. The VFA based copolymer additives are cost effective compared with n-vinyl acetamide and styrene or substituted styrene copolymers, VFA homopolymers, and have improved performance to enhance strength properties of the paper when compared with vinylamine homopolymers.

The present invention provides a process for making vinylamine-vinylformamide-styrene terpolymer additives comprising:

a) reacting vinylformamide for a period of time with styrene or substituted styrene under a free radical, emulsion polymerization reaction conditions;

b) producing a first polymer product which comprises randomly distributed repeating units by the formula (I) and (II):

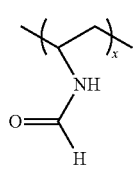
(I)

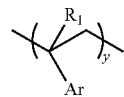
(II)

wherein Ar is an aromatic selected from the group consisting of phenyl and phenyl substituted with alkyl, alkoxy, sulfonate, halo and pyridine or substituted pyridine; $R_1$ is hydrogen or alkyl; x and y are numbers greater than zero mole percent, and the sum of x and y is 100 mole percent, the ratio of x:y is in the range of from 99:1 to 50:50;

c) hydrolyzing the first polymer product using an acid or base treatment;

d) producing a second polymer product comprising randomly distributed repeating monomer units having at least two of the formula (III), (IV), (V) and (VI):

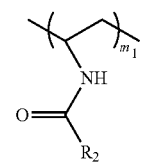
(III)

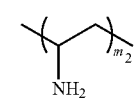
(IV)

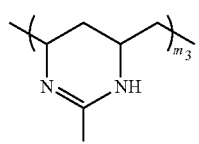
(V)

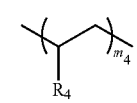
(VI)

wherein,
$R_2$ and $R_3$ are H;
$R_4$ is H or alkyl;
$m_1$ and $m_2$ independently is a positive mole percent and, $m_3$ and $m_4$ independently may be 0 to 99 mole percent, and the sum of $m_1$, $m_2$, $m_3$ and $m_4$ is equal to or less than x mole percent of formula (I).

In one embodiment of the present invention, the amount of each of the employed monomers should be determined by fully considering performance and stability of the resulting terpolymer. The ratio of VFA to styrene or substituted styrene in copolymer can be varied from 99:1 to 50:50, can be 80:20 to 51:49, and may be 80:20 to 70:30, the sum of percentages of monomer feed in reaction is always 100.

At above mentioned feed ratio VFA and styrene monomers are miscible with each other, and may be added as a mixture of monomers in reaction feed or can be added separately as neat solution.

In the present invention, surfactant for polymerization may be selected based on its, Hydrophile-Lipophile Balance (HLB) number, functionality that does not poison free radical or react with monomers. The HLB values for the surfactant of interest can be less than 10 or more than 10, can be between 4 to 16, and may be between 10 to 14. The amount of surfactant in the polymerization is employed in conventional amounts, for example 0.1% to 4%, can be 0.15% to 2%, and may be 0.3% to 1% by weight, based on the monomers.

In one embodiment of the present invention, the hydrophobic monomer employed for copolymerization is selected from one or more than one of the following aromatic monomers, styrene, α-methyl styrene, halogenated styrene, alkoxy styrene, sulfonated styrene and pyridine or substituted pyridine.

In one embodiment of the present invention, the polymerization is carried out in a solvent or diluents. The choice of solvent depends on compatibility of monomers and end use of final product. The polymerization can be performed in aqueous solvents, or organic solvents, or mixtures of both. The preferable solvent for polymerization is water, in which resulting VFA-styrene polymer forms as a micro particulate structure. The pH during polymerization is from 4 to 10, can be from 5 to 8, and may be 6 to 7.

In one embodiment of the present invention, a polymerization reaction is initiated using free radical initiators or other materials known in the art for this purpose, for example peroxides, hydroperoxides, redox catalysts, or azo compounds which decompose to give free radicals. The preferable radical initiator for polymerization is water soluble azo compounds. The initiators are employed in conventional amounts, and by controlling the monomer to initiator ratio, molecular weight of the polymer can be altered; a technique well known to those skilled in the art. Other chain extender or chain transfer agents that can regulate VFA copolymer molecular weight can be employed.

The present invention also provides an aqueous dispersion comprising the resulting polymer product from a process which comprises:

a) reacting vinylformamide with styrene or substituted styrene under a free radical, emulsion polymerization reaction conditions;

b) producing a polymer product which comprises randomly distributed repeating units by the formula (I) and (II):

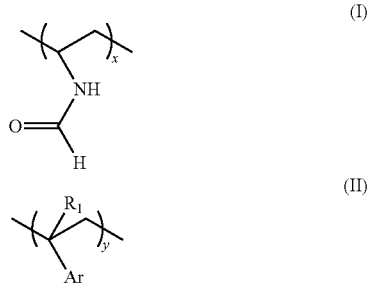

wherein Ar is an aromatic selected from the group consisting of phenyl and phenyl substituted with alkyl, alkoxy, sulfonate, halo and pyridine or substituted pyridine; $R_1$ is hydrogen or alkyl; x and y are numbers greater than zero mole percent, and the sum of x and y is 100 mole percent, the ratio of x:y is in the range of from 99:1 to 50:50;

wherein, the polymer product in said aqueous dispersion is in a form of micro particles, and the particle size of the polymer product is in the range of from 30 nanometer to 2000 nanometer.

In one embodiment of the present invention, obtained emulsions are well dispersed emulsions of VFA and styrene or substituted styrene copolymer and are micro particles in nature, wherein the particle size is from 30 nanometer to 2000 nanometer, can be from 50 nanometer to 1000 nanometer, and may be from 70 nanometer to 200 nanometer. The particle size and size distribution of polymeric micro particles can be controlled by polymerization conditions, surfactant concentration, and ratio of co-monomers.

In one embodiment of the present invention, chain extenders that introduce a branched structure in VFA and styrene copolymers may be used. These chain extenders include, but are not limited to, divinylbenzene, ethylene glycol di(meth) acrylate, diethyleneglycol di(meth)acrylate, methylenebisacrylamide, methylene-bis-(meth) acrylamide, ethylene-bis-(meth) acrylamide, and hexamethylene-bis-(meth) acrylamide. These may be used in an amount of 0.005 to 3 molar percent, can be 0.01 to 1 molar percent, and may be 0.02 to 0.5 molar percent.

In the present invention, the polymerization temperature may depend on type of initiator employed and its half life period at decomposition temperature. The polymerizations of the present invention are performed at temperatures of from about 25° C. to about 125° C., temperatures can be between 30° C. to 90° C., and may be between 60° C. to 85° C.

In one embodiment of the present invention, polymerization reactions may be performed under atmospheric, reduced, or super atmospheric pressure. The preferable pressure for polymerization is reduced atmospheric pressure.

The obtained VFA and styrene or substituted styrene polymer micro particles rich in VFA content are insoluble in common organic solvents and are easily dispersible in water. In a very specialized solvent system comprising 1,1,1,3,3,3-hexafluoro-2-propanol and inorganic salts, VFA and styrene copolymers shows maximum solubility.

Formation of a copolymer is confirmed by different spectroscopic techniques and is discussed in the experimental section. Without wishing to be bound by theory it is believed that the VFA and styrene or substituted styrene units in obtained copolymers are randomly distributed which offers desired material properties.

The present invention further provides a vinylamine-vinylformamide-styrene terpolymer additive comprising the resulting second polymer product from a process which comprises:

a) reacting vinylformamide with styrene or substituted styrene in a free radical, emulsion polymerization reaction;

b) producing a first polymer product which comprises randomly distributed repeating units of formula (I) and (II);

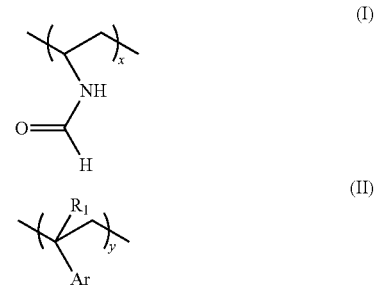

wherein Ar is an aromatic selected from the group consisting of phenyl and phenyl substituted with alkyl, alkoxy, sulfonate, halo and pyridine or substituted pyridine; $R_1$ is hydrogen or alkyl; x and y are numbers greater than zero mole percent, and the sum of x and y is 100 mole percent, and the ratio of x:y is in the range of from 99:1 to 50:50;

c) hydrolyzing the first polymer product with an acid or base treatment;

d) producing a second polymer product comprising randomly distributed repeating monomer units having at least two of the formula (III), (IV), (V) and (VI):

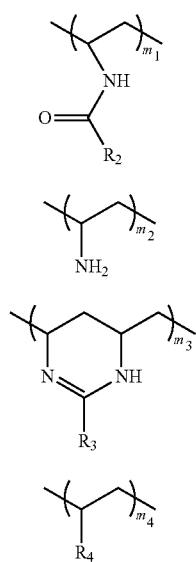

wherein, $R_2$ and $R_3$ are H;

$R_4$ is H or alkyl;

$m_1$ and $m_2$ are independently a positive mole percent, $m_3$ and $m_4$ independently may be 0 to 99 mole percent, and the sum of $m_1$, $m_2$, $m_3$ and $m_4$ is equal to or less than x mole percent of formula (I), wherein, the first polymer product is in the form of microparticles, and the particle size of the first polymer product is in the range of from 30 nanometer to 2000 nanometer.

In one embodiment of the present invention, the VFA-Styrene or substituted styrene copolymers are subjected to hydrolysis to introduce amine functionality. The formamide group of VFA-styrene copolymer can be hydrolyzed by acid or base treatments and vinylamine groups can be introduced, as described in U.S. Pat. Nos. 4,421,602 and 4,774,285. However, in addition to vinylamine functionality, hydrolysis of formamide can also introduce amidine functionality to the resulting polymer. (see U.S. Pat. Appl. No. 2010/0193148 A1). The acid or base treatment on VFA-styrene copolymer does not alter the structure of styrenic moiety. The degree of hydrolysis of formamide groups can be altered by the amount of acid or base used, reaction temperature, and length of hydrolysis reaction. Polymers obtained by a base treatment have a degree of hydrolysis from 10 to 99%, can be 20 to 80%, and may be 30 to 70%. The temperature for the hydrolysis reaction may be from about 25° C. to 100° C., can be between 40° C. to 90° C., and may be between 60° C. to 80° C. The degree of hydrolysis is controlled by the amount of base addition to the VFA-styrene copolymer, and is monitored by FT-IR analysis.

In another embodiment of the present invention, the hydrolyzed VFA-styrene polymer, in which 10 to 99%, can be 20 to 80%, and may be 30 to 70% of the VFA units are converted to vinylamine functionality resulting in a VAm-VFA-styrene terpolymer, and are employed in papermaking processes to improve paper dry strength and wet strength properties. The hydrolyzed micro particle dispersion of terpolymers was added to the paper stock, prior to sheet formation, in an amount of from 0.05 to 2% by weight and can be 0.1 to 1% by weight based on dry fiber. The invention can be employed to make various grades of paper that benefit from enhanced dry strength including copy paper, container board, corrugating medium, file folder, newsprint, paper board, packaging board, printing and writing, and publication grade. These paper grades can be comprised of any typical pulp fibers including groundwood, Kraft, sulfate, mechanical, and recycled. The aqueous dispersion of the hydrolyzed terpolymers may also be applied to the surface of the paper, and may help to improve strength as well as water hold out properties of the paper.

In one embodiment of the present invention, partially hydrolyzed terpolymers bearing styrene between 20 to 30 weight percent greatly improves strength properties of the paper in comparison to its fully hydrolyzed analogues or polymers bearing different styrene content, or hydrolyzed VFA homopolymers (Hercobond® 6350 and 6363 papermaking additives available from Ashland Inc).

The following examples further explain the invention and demonstrates that the micro particle nature of the polymer helps to improve dry strength, wet strength, retention, drainage properties of the paper when used during paper making process. The examples and data presented below better illustrate the benefits of the claimed invention and are not meant to be limiting.

EXAMPLE 1

Synthesis of n-vinylformamide and Styrene Polymer
(Table 1, Example 1-3)

A series of copolymers of n-vinylformamide with styrene as exemplified in Example 1-3, were prepared as follows: to a 1 liter resin kettle equipped with overhead stirrer, thermocouple, condenser, nitrogen inlet-outlet, and pressure gauge was added 445.81 g of deionized water, 1.22 grams of 75 wt % aqueous phosphoric acid, 1.79 grams of 25 wt % aqueous sodium hydroxide and 0.5 g of Rhodameen PN-430 surfactant (available from Rhodia, France). The resultant solution pH was adjusted to 6.5+/−0.3. The kettle was heated to 80° C. while stirring at 250 RPM. The pressure was slowly lowered to about 320 torr.

A mixture of n-vinylformamide (VFA, 90.4 grams), Styrene (33.12 g), and 3.0 wt % aqueous V-50 (18.47 grams) initiator (available from Wako Chemicals USA, Inc., Richmond, USA) are added concurrently over 90 minutes for the monomers and 170 minutes for the initiator respectively. After the VFA addition was complete, 10 grams of boiled (deaerated) deionized water was used to rinse the VFA line. The polymerization temperature was controlled at 78+/−2° C. After the V-50 addition was complete, the kettle vacuum was dropped to about 350 torr. After a total time of 260 minutes the vacuum was released and the reactor was flushed with nitrogen (3 cycles of vacuum and nitrogen refill). Then 18.47 g of 3 wt % V-50 solution was added slowly over a period of 1 hour at 78+/−2° C., after complete addition reaction was continued for additional 2 hours. After completion reactor was cooled to room temperature. The viscosity of the composition was measured using a Brookfield Viscometer LV unit with spindle #62 (units of centipoise (cP).

The solid state 13C NMR analysis of the obtained polymers was performed by grinding the polymers into fine powder in a cryogenic freezer mill and packing the powder into 4-mm NMR rotors. The solid state 13C NMR analysis of VFA-styrene copolymer sample in which VFA to styrene feed ratio was maintained at 73.2 to 26.8 shows random distribution of the comonomer. Furthermore, the ratio of VFA to styrene calculated by NMR analysis is in close agreement with feed ratio. A solvent extraction experiment was also performed to further confirm copolymer formation. The VFA-styrene copolymer was thoroughly washed with deuterated chloroform dissolving any atactic polystyrene. The $CDCl_3$ fraction was concentrated and analyzed by proton NMR, which did not show any peaks corresponding to polystyrene homopolymer. Also, the FT-JR analysis showed a strong absorbance at 1684 $cm^{-1}$ corresponding to a carbonyl group of amide and peaks in the finger print region corresponding to styrene units. For SEC analysis, polymers were dissolved in hexafluoroisopropanol and inorganic salts in which quantitative amounts of polymer were soluble. The SEC analysis of the soluble fraction using both an RI and UV detector showed a monomodal peak, supporting the above claim for formation of copolymer. Further, the SEC analysis using UV detection of different fractions collected at different time intervals suggest styrene is uniformly distributed through out the polymer chain. Particle size was measured by light scattering, using Horiba LA900 and showed a median particle size of 90 nanometer. For thermal analyses, polymers were precipitated in methanol and dried under vacuum. The glass transition temperature (Tg) analysis of the copolymers by Differential Scanning calorimetry analysis are recorded from the second heating cycle and are reported in Table 1. Glass transition temperatures were between 50° C. to 98° C., and increased with lowering styrene content from 49 wt % to 7 wt %.

Polymers of Examples 1-1, 1-2, 1-4 and 1-5 were prepared following a similar process, except that different ratios of VFA to styrene were used and are listed in Table 1.

TABLE 1

Effect of VFA to styrene ratio on polymer properties

| Example | % Total Solid | Styrene Mol % | Styrene Wt % | Brookfield Viscosity, centipoise (cP) | Mean Particle Size (μm) | Tg (° C.) |
|---|---|---|---|---|---|---|
| 1-1 | 20.1 | 5 | 7.2 | 2819 | 13 | 98.5 |
| 1-2 | 20.2 | 10 | 14 | 1539 | 0.08 | 75.7 |
| 1-3 | 19.7 | 20 | 26.8 | 626 | 0.09 | 71.0 |
| 1-4 | 19.6 | 30 | 38.6 | 194 | 0.12 | 54.7 |
| 1-5 | 20.3 | 40 | 49.4 | 156 | 0.13 | 51.7 |

These experiments were performed at equal surfactant concentration, and different VFA to styrene ratio suggest viscosity of copolymer emulsion and micro particle size is dependent on VFA to styrene ratio. Additionally, glass transition temperature of copolymers decreased from 98.5° C. to 51.7° C., with an increase in styrene content from 7.2 wt % to 49.4 wt %, respectively.

EXAMPLE 2

Effect of Surfactant and Chain Extender on Polymer Properties

Example 1 is repeated, except that the concentration and type of surfactant were varied. Polyoxyethylated oleyl amine (PN-430) with HLB 14.2, and Peroxyethylated tallow amine (T-15, available from Rhodia, France) with HLB 10 were employed as surfactant and divinylbenzene was used as chain extender.

TABLE 2

Effect of surfactant on polymer properties

| Example | Surfactant (wt %) | DVB (wt %) | % Total Solid | Brookfield Viscosity, cP | Mean Particle Size, (μm) | Tg (° C.) |
|---|---|---|---|---|---|---|
| 2-1 | PN-430 (0.4) | 0 | 19.7 | 626 | 0.09 | 71 |
| 2-2 | T-15 (0.4) | 0 | 19.1 | 907 | 0.08 | 70.6 |
| 2-3 | PN-430 (0.8) | 0 | 18.6 | 299 | 0.09 | 71.7 |
| 2-4 | T-15 (0.8) | 0 | 19.1 | 667 | 0.08 | 74.9 |
| 2-5 | PN-430 (0.4) | 0.4 | 19.4 | 458 | 0.11 | 70.7 |
| 2-6 | PN-430 (0.6) | 0 | 18.9 | 222 | 0.16 | — |
| 2-7 | T-15 (0.4) | 0.4 | 18.6 | 534 | 0.07 | 71.1 |
| 2-8 | PN-430 (0.8) | 0.4 | 19.3 | 338 | 0.1 | 67.6 |
| 2-9 | T-15 (0.8) | 0.4 | 20.2 | 595 | 0.08 | 71.5 |
| 2-10 | PN-430 (0.6) | 0.8 | 19.2 | 328 | 0.11 | — |

These results show surfactant type, and surfactant concentration impacts viscosity of copolymer emulsion properties. Whereas, polymer chain extender has minimal impact on emulsion viscosity and also copolymer properties.

EXAMPLE 3

Hydrolysis of N-Vinylformamide and Styrene Polymer

Hydrolysis of NVF/Styrene polymer was performed using a caustic treatment. The amount of caustic used and reaction time can be varied depending on the desired hydrolysis level (see Table 3). In a typical example, a 500-mL round-bottom flask was fitted with a condenser, pH and temperature probes, a temperature controlled heating mantle, an addition funnel, and a mechanical stirrer. To the flask was added 200 grams of polymer intermediate, to this 3.2 g of 20% sodium bisulfite solution was added and stirred for 10 min. The reaction mixture was heated to 80° C. and then 32 grams of 25 wt % aqueous sodium hydroxide solution (caustic) was added over 15 minutes. After 3 hours at 80° C., the reaction mixture was cooled to 40° C. and then 30 wt % aqueous hydrochloric acid was added over 5 minutes to adjust the pH to 9. The degree of hydrolysis is monitored by FTIR analysis, in which intensity of the 1684 $cm^{-1}$ peak decreased, and intensity of the new broad peak at 3400 $cm^{-1}$ due to primary amine group increased. Similarly in one example, the zeta potential measured on VFA-styrene copolymer particles, showed a particle charge of 1.92 and 1.30 mV, at pH 4 and 6, respectively. Upon hydrolysis, the resulting VAm-VFA-styrene copolymer showed a particle charge of 86.04 and 41.96 mV, at pH 4 and 6, respectively, suggesting formation of primary amine functionality. The glass transition temperatures of hydrolyzed polymers containing VAm functionality are comparatively lower than their corresponding prepolymers.

TABLE 3

Hydrolysis of n-vinylformamide and styrene copolymer

| Example | Sample ID | % Hydrolysis | % Active Solid | Brookfield Viscosity, cP |
|---|---|---|---|---|
| 3-1 | 1-1 | 99 | 15.6 | 395 |
| 3-2 | 1-2 | 99 | 15.9 | 477 |
| 3-3 | 1-3 | 99 | 16.1 | 181 |
| 3-4 | 1-4 | 99 | 16.6 | 388 |

TABLE 3-continued

Hydrolysis of n-vinylformamide and styrene copolymer

| Example | Sample ID | % Hydrolysis | % Active Solid | Brookfield Viscosity, cP |
|---|---|---|---|---|
| 3-5 | 1-5 | 99 | 17.4 | 294 |
| 3-6 | 2-2 | 50 | 15.9 | 398 |
| 3-7 | 2-2 | 99 | 13.7 | 195 |
| 3-8 | 2-3 | 50 | 15.5 | 300 |
| 3-9 | 2-3 | 99 | 13.4 | 182 |
| 3-10 | 2-4 | 50 | 15.9 | 345 |
| 3-11 | 2-4 | 99 | 13.7 | 198 |
| 3-12 | 2-5 | 50 | 16.1 | 280 |
| 3-13 | 2-5 | 99 | 13.9 | 135 |
| 3-14 | 2-6 | 30 | 16.6 | 335 |
| 3-15 | 2-6 | 65 | 14.7 | 268 |
| 3-16 | 2-6 | 99 | 13.4 | 228 |
| 3-17 | 2-7 | 50 | 15.5 | 296 |
| 3-18 | 2-7 | 99 | 13.4 | 163 |
| 3-19 | 2-8 | 50 | 15.9 | 250 |
| 3-20 | 2-8 | 99 | 13.6 | 120 |
| 3-21 | 2-9 | 50 | 16.6 | 195 |
| 3-22 | 2-9 | 99 | 14.3 | 143 |
| 3-23 | 2-10 | 30 | 17.3 | 420 |
| 3-24 | 2-10 | 65 | 15.1 | 190 |
| 3-25 | 2-10 | 99 | 13.4 | 146 |

Table 3 suggests hydrolyzed copolymer emulsions are less viscous when compared with VFA-styrene copolymer emulsions.

EXAMPLE 4

Evaluation of Terpolymers as Dry Strength Additives in Papermaking Applications

The dry strengths of papers made with the vinyl amine-vinylformamide-styrene terpolymer additives of the above examples were compared with the dry strengths of paper made with a benchmark dry strength resin polyvinylamine (Hercobond® 6350 paper performance additive, available from Ashland Inc.).

Linerboard paper was made using a papermaking machine. The paper pulp was a 100% recycled medium with 50 ppm hardness, 25 ppm alkalinity, 2.5% GPC D15F oxidized starch, 0.5% Stalok 300 cationic starch and 2000 µS/cm conductivity. The system pH was 7.0 and the pulp freeness was 350-420 Canadian Standard Freeness (CSF) with the stock temperature at 52° C. The basis weight was 100 lbs per 3000 ft². VAm-VFA-styrene terpolymer additives prepared in the above examples were added as dry strength agents to the wet end of the papermaking machine at the level of 0.3 weight % of polymer active versus dry paper pulp. Ring crush, dry Mullen burst, dry tensile, and wet tensile tests were used to measure the dry strength effects.

The dry strength test results are shown below in Table 4. Performance of the vinylamine-vinylformamide-styrene terpolymer additives are expressed as a percentage of the dry strength of paper made without a dry strength resin.

TABLE 4

Strength testing of linerboard made using vinyl amine-vinylformamide-styrene terpolymer additives and wet end starch

| Example | Additive | Ring Crush | Dry Mullen | Wet Tensile |
|---|---|---|---|---|
| 4-1 | — | 100 | 100 | 100 |
| 4-2 | 3-1 | 104 | 103.5 | 447.8 |
| 4-3 | 3-2 | 104.1 | 104.7 | 409 |
| 4-4 | 3-3 | 104.9 | 107.4 | 403 |

TABLE 4-continued

Strength testing of linerboard made using vinyl amine-vinylformamide-styrene terpolymer additives and wet end starch

| Example | Additive | Ring Crush | Dry Mullen | Wet Tensile |
|---|---|---|---|---|
| 4-5 | 3-4 | 101.9 | 103.9 | 306.9 |
| 4-6 | 3-5 | 101.4 | 100.3 | 263 |

These data illustrate that the dry strength of the paper can be improved by using VAm-VFA-styrene copolymer as wet end dry strength additive.

Linerboard paper was made using paper making conditions mentioned in Example 4 except Stalok 300 was not used. VAm-VFA-styrene terpolymer additives prepared in Example 3 were added as dry strength agents to the wet end of the papermaking machine at a level of 0.3 weight % of polymer active versus dry paper pulp. Ring crush, dry Mullen burst, dry tensile, and wet tensile tests were used to measure the dry strength effects.

The dry strength test results are shown below in Table 5. Performances of the vinylamine-vinylformamide-styrene terpolymer additives are expressed as a percentage of the dry strength of paper made without a dry strength resin.

TABLE 5

Strength testing of linerboard made using vinyl amine-vinylformamide-styrene terpolymer additives and no wet end starch

| Example | Additive | Ring Crush | Dry Mullen | Dry Tensile | Wet Tensile |
|---|---|---|---|---|---|
| 5-1 | — | 100.0 | 100.0 | 100.0 | 100.0 |
| 5-2 | Hercobond ® 6350 | 108.2 | 106.8 | 103.3 | 509.0 |
| 5-3 | 3-6 | 109.4 | 121.2 | 103.8 | 330.4 |
| 5-4 | 3-7 | 107.5 | 109.1 | 102.1 | 390.6 |
| 5-5 | 3-8 | 108.8 | 110.1 | 107.2 | 267.1 |
| 5-6 | 3-9 | 111.2 | 106.8 | 96.1 | 319.7 |
| 5-7 | 3-10 | 108.9 | 118.4 | 103.6 | 318.2 |
| 5-8 | 3-11 | 107.8 | 107.7 | 98.9 | 386.8 |
| 5-9 | 3-12 | 108.6 | 116.9 | 103.9 | 296.9 |
| 5-10 | 3-13 | 110.9 | 116.5 | 106.5 | 384.0 |
| 5-11 | 3-14 | 112.1 | 124.3 | 111.9 | 320.1 |
| 5-12 | 3-15 | 111.5 | 110.3 | 104.7 | 403.1 |
| 5-13 | 3-16 | 108.1 | 117.6 | 107.2 | 488.2 |
| 5-14 | 3-17 | 111.0 | 113.6 | 109.5 | 325.0 |
| 5-15 | 3-18 | 110.1 | 109.5 | 103.6 | 381.0 |
| 5-16 | 3-19 | 109.5 | 110.3 | 109.5 | 290.0 |
| 5-17 | 3-20 | 109.4 | 111.2 | 105.3 | 354.4 |
| 5-18 | 3-21 | 111.1 | 114.6 | 108.3 | 294.2 |
| 5-19 | 3-22 | 104.5 | 115.3 | 104.5 | 357.8 |
| 5-20 | 3-24 | 110.9 | 118.1 | 113.7 | 359.5 |
| 5-21 | 3-25 | 105.6 | 103.7 | 104.7 | 413.0 |
| 5-22 | 3-26 | 112.1 | 104.4 | 103.6 | 487.1 |

These data illustrate that partially hydrolyzed VFA-styrene copolymers have better performance compared with Hercobond® 6350. At equal addition levels, hydrolyzed VFA-styrene copolymers offer a lower cost additive and also provides improved dry strength when compared with polyvinylamine. Wet tensile of paper made with hydrolyzed VFA-styrene copolymer micro particles was expected to be lower when compared with polyvinylamine.

The vinylamine-vinylformamide-styrene terpolymer additive of the present invention, is added to the wet end of the paper making system to improve paper making processes and paper wet and dry strength, and it can be applied on an already formed paper to improve paper finish properties. Thus, the present invention provides a paper product which comprises a second polymer product prepared by the process of the present invention, or a paper product which comprises the vinylamine-vinylformamide-styrene terpolymer additive of the present invention.

What is claimed is:

1. A process for making vinylamine-vinylformamide-styrene terpolymer additives comprising:
   a) reacting vinylformamide with styrene or substituted styrene under free radical, emulsion polymerization reaction conditions;
   b) producing a first polymer product which comprises randomly distributed repeating units by the formula (I) and (II):

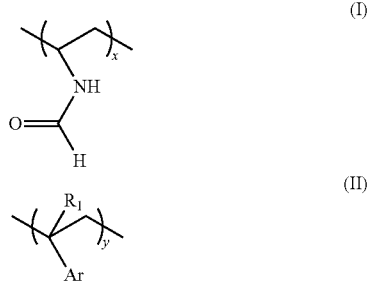

wherein Ar is an aromatic selected from the group consisting of phenyl and phenyl substituted with alkyl, alkoxy, sulfonate, halo and pyridine or substituted pyridine; $R_1$ is hydrogen or alkyl; x and y are numbers greater than zero mole percent, and the sum of x and y is 100 mole percent, the ratio of x:y is in the range of from 99:1 to 50:50;
   c) hydrolyzing the first polymer product with an acid or base treatment;
   d) producing a second polymer product comprising randomly distributed repeating monomer units having at least two of the formula (III), (IV), (V) and (VI):

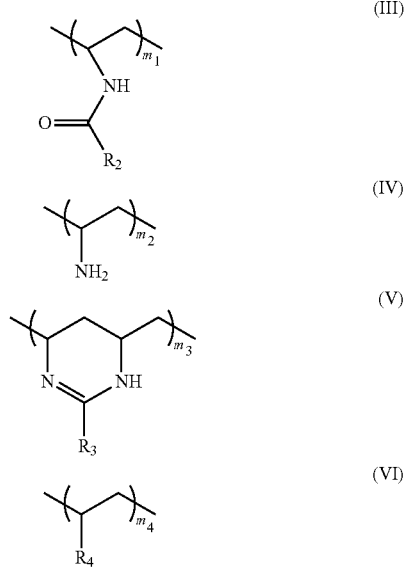

wherein,
$R_2$ and $R_3$ are H;
$R_4$ is H or alkyl;

$m_1$ and $m_2$ independently is a positive mole percent, and $m_3$ and $m_4$ independently is 0 to 99 mole percent, and the sum of $m_1$, $m_2$, $m_3$ and $m_4$ is equal to or less than the x mole percent of formula (I).

2. The process of claim 1, wherein Ar is phenyl and $R_1$ is H.

3. The process of claim 1, wherein the first polymer product is vinylformamide-styrene copolymer.

4. The process of claim 1, wherein the emulsion polymerization reaction is carried out at temperature in the range of from about 25° C. to about 120° C.

5. The process of claim 1, wherein the emulsion polymerization reaction is carried out at temperature in the range of from about 30° C. to about 90° C.

6. The process of claim 1, wherein the emulsion polymerization reaction is carried out at temperature in the range of from about 60° C. to about 85° C.

7. The process of claim 1, wherein the ratio of x:y is in the range of from 80:20 to 51:49.

8. The process of claim 1, wherein the ratio of x:y is in the range of from 80:20 to 70:30.

9. The process of claim 1, wherein about 10% to 99% of formamide groups of the first polymer product are subsequently hydrolyzed in step c) to introduce cationic functionality of the second polymer product of step d).

10. The process of claim 1, wherein about 20% to 80% of formamide groups of the first polymer product are subsequently hydrolyzed in step c) to introduce cationic functionality of the second polymer product of step d).

11. The process of claim 1, wherein about 30% to 70% of formamide groups of the first polymer product are subsequently hydrolyzed in step c) to introduce cationic functionality of the second polymer product of step d).

12. The process of claim 1, wherein the second polymer product is a cationic, and water dispersible polymer.

13. An aqueous dispersion comprising the resulting polymer product from a process which comprises:
   a) reacting vinylformamide with styrene or substituted styrene under free radical, emulsion polymerization reaction conditions
   b) producing a polymer product which comprises randomly distributed repeating units by the formula (I) and (II):

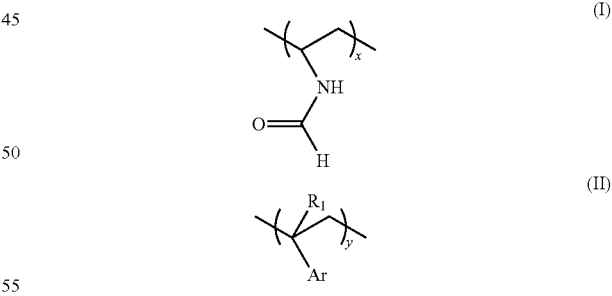

wherein Ar is an aromatic selected from the group consisting of phenyl and phenyl substituted with alkyl, alkoxy, sulfonate, halo and pyridine or substituted pyridine; $R_1$ is hydrogen or alkyl; x and y are numbers greater than zero mole percent, and the sum of x and y is 100 mole percent, the ratio of x:y is in the range of from 99:1 to 50:50;

wherein, the polymer product in said aqueous dispersion is in a form of microparticles, and the particle size of the polymer product is in the range of from 30 nanometer to 2000 nanometer.

14. The aqueous dispersion of claim 13, wherein the particle size of the polymer product is in the range of from 50 nm to 1000 nanometer.

15. The aqueous dispersion of claim 13, wherein the particle size of the polymer product is in the range of from 70 nanometer to 200 nanometer.

16. A vinylamine-vinylformamide-styrene terpolymer additive comprising the resulting second polymer product from a process which comprises:
   a) reacting vinylformamide with styrene or substituted styrene under free radical, emulsion polymerization reaction conditions;
   b) producing a first polymer product which comprises randomly distributed repeating units by the formula (I) and (II):

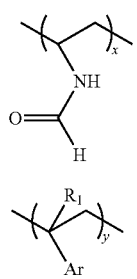

(I)

(II)

wherein Ar is an aromatic selected from the group consisting of phenyl and phenyl substituted with alkyl, alkoxy, sulfonate, halo and pyridine or substituted pyridine; $R_1$ is hydrogen or alkyl; x and y are numbers greater than zero mole percent, and the sum of x and y is 100 mole percent, the ratio of x:y is in the range of from 99:1 to 50:50;
   c) hydrolyzing the first polymer product using and acid or base treatment;
   d) producing a second polymer product comprising randomly distributed repeating monomer units having at least two of the formulae (III), (IV), (V) and (VI):

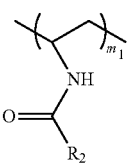

(III)

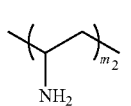

(IV)

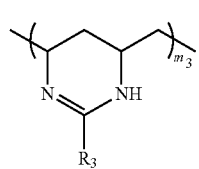

(V)

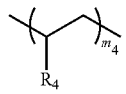

(VI)

wherein,
   $R_2$ and $R_3$ are H
   $R_4$ is H or alkyl;
   $m_1$ and $m_2$ independently is a positive mole percent, and $m_3$ and $m_4$ independently is 0 to 99 mole percent, and the sum of $m_1$, $m_2$, $m_3$ and $m_4$ is equal to or less than the x mole percent of formula (I),
   wherein, the first polymer product is in a form of microparticles, and the particle size of the first polymer product is in the range of from 30 nanometer to 2000 nanometer, and the second polymer product is vinylamine-vinylformamide-styrene terpolymer, and
   wherein, said vinylamine-vinylformamide-styrene terpolymer additive is in a form of microparticles in aqueous dispersion, and the viscosity measured at ambient temperature (about 20° C. to about 25° C.) of active solids in the range of from 13.0% to 18.0% of vinylamine-vinylformamide-styrene terpolymer is in the range of from 100 to 500 cP.

17. The vinylamine-vinylformamide-styrene terpolymer additive of claim 16, wherein the particle size of the first polymer product is in the range of from 50 nm to 1000 nanometer.

18. The vinylamine-vinylformamide-styrene terpolymer additive of claim 16, wherein the particle size of the first polymer product is in the range of from 70 nanometer to 200 nanometer.

19. The vinylamine-vinylformamide-styrene terpolymer additive of claim 16, wherein about 10% to 99% of formamide groups of the first polymer product are subsequently hydrolyzed in step c) to introduce cationic functionality of the second polymer product of step d).

20. The vinylamine-vinylformamide-styrene terpolymer additive of claim 16, wherein about 20% to 80% of formamide groups of the first polymer product are subsequently hydrolyzed in step c) to introduce cationic functionality of the second polymer product of step d).

21. The vinylamine-vinylformamide-styrene terpolymer additive of claim 16, wherein about 30% to 70% of formamide groups of the first polymer product are subsequently hydrolyzed in step c) to introduce cationic functionality of the second polymer product of step d).

22. The vinylamine-vinylformamide-styrene terpolymer additive of claim 16, wherein the vinylamine-vinylformamide-styrene terpolymer additive is added to the wet end of the paper making system to improve paper making process and paper wet and dry strength.

23. The vinylamine-vinylformamide-styrene terpolymer additive of claim 16, wherein the vinylamine-vinylformamide-styrene terpolymer additive is applied on already formed paper to improve paper finish properties.

24. A paper product comprising the second polymer product of claim 1.

25. A paper product comprising the vinylamine-vinylformamide-styrene terpolymer additive of claim 16.

* * * * *